United States Patent

Maru

[11] 4,192,906
[45] Mar. 11, 1980

[54] ELECTROCHEMICAL CELL OPERATION AND SYSTEM

[75] Inventor: Hansraj C. Maru, Brookfield Center, Conn.

[73] Assignee: Energy Research Corporation, Danbury, Conn.

[21] Appl. No.: 923,368

[22] Filed: Jul. 10, 1978

[51] Int. Cl.² .............................................. H01M 8/04
[52] U.S. Cl. ........................................ 429/13; 429/24; 429/26
[58] Field of Search ............................. 429/13, 24, 26

[56] References Cited

U.S. PATENT DOCUMENTS

| 3,198,664 | 8/1965 | Kunz | 429/24 |
|---|---|---|---|
| 3,455,743 | 7/1969 | Huebscher et al. | 429/26 |
| 3,507,702 | 4/1970 | Sanderson | 429/24 |
| 3,779,811 | 12/1973 | Bushnell et al. | 429/26 |

Primary Examiner—Donald L. Walton
Attorney, Agent, or Firm—Watson, Leavenworth, Kelton & Taggart

[57] ABSTRACT

Thermal control in fuel cell operation is affected through sensible heat of process gas by providing common input manifolding of the cell gas flow passage in communication with the cell electrolyte and an additional gas flow passage which is isolated from the cell electrolyte and in thermal communication with a heat-generating surface of the cell. Flow level in the cell gas flow passage is selected based on desired output electrical energy and flow level in the additional gas flow passage is selected in accordance with desired cell operating temperature.

17 Claims, 5 Drawing Figures

ELECTROCHEMICAL CELL OPERATION AND SYSTEM

FIELD OF THE INVENTION

This invention relates to electrochemical cells, such as fuel cells and batteries of type wherein reactant or product gas is conducted to or from the cells. The invention relates more particularly to thermal control for such cells.

BACKGROUND OF THE INVENTION

In the design of fuel cells and like electrical energy producing devices involving reactant or product gas undergoing electrochemical reaction (process gas), thermal control is a dominant parameter. The electrochemical reactions in such devices are invariably accompanied by heat generation or heat absorption because of entropy changes accompanying the reaction and irreversibilities caused by diffusion and activation overpotentials and ohmic resistance. In the accommodation of thermal control, the art has looked to various techniques, none of which are entirely satisfactory.

The thermal control technique seemingly most desirable takes advantage of the sensible heat of the process gas itself as a vehicle for thermal control. Thus, if removal of heat from the cell is desired, the incoming process gas may be supplied to the cell at a temperature lower than the cell operating temperature such that exiting gas removes heat simply by increase in temperature thereof in passage through the cell. In this technique, one adjusts the process gas flow level above the flow level required for production of preselected measure of electrical energy, such additional process gas serving the heat removal function. Disadvantages attending this practice include undesirable pressure drops based on the increased process gas flow, auxiliary power penalty and loss of electrolyte through vaporization or entrainment. By auxiliary power is meant the power requirements of apparatus accessory to the fuel cell proper, e.g., gas pumps, pressurizing systems and the like. As respects electrolyte loss, all process gas in this gas sensible heat technique is in communication with the cell electrolyte in its passage through the cell and, where substantial additional gas is required for thermal control, a very high electrolyte loss due to saturation of the gas with electrolyte vapor is observed in electrolyte gas resulting in quite high electrolyte loss.

In a second thermal control technique, the art has looked to limiting the temperature gradients inside fuel cells by employment of a bipolar plate having an extended fin disposed outside the cell proper, as shown in U.S. Pat. No. 3,623,913 to Adlhart et al. While this technique provides a somewhat more uniform cell temperature, high gas flow passing directly through the cell can result in high electrolyte loss and increased auxiliary power.

A third thermal control technique relies on the sensible heat of a dielectric liquid. Such sensible-heat liquid approach requires much lower auxiliary power as compared to the gaseous heat transfer medium, but requires a separate heat transfer loop and an electrically isolated manifolding system. To avoid shunt currents between stacked cells, dielectric fluids such as fluorocarbon or silicon-based oils have been traditionally used as the heat transfer media. Because the catalyst material may be poisoned severely by even a trace amount of these dielectric fluids, a small leak from the heat transfer loop may be fatal to the cell. Also, the dielectric liquids are flammable and have toxic reaction products.

In a fourth technique for thermal control, the art has relied on the latent heat of liquids. Latent heat liquids (U.S. Pat. Nos. 3,498,844 and 3,507,702 to Sanderson; U.S. Pat. No. 3,761,316 to Stedman; and U.S. Pat. No. 3,969,145 to Grevstad et al.) can provide heat transfer at nearly uniform temperature, although there may be some temperature gradients in the stacking direction if the heat transfer plate is placed between a group of cells. The auxiliary power requirements are expected to be low. Suitable dielectric fluids having boiling points in the range of cell operating temperature can be used, but the disadvantages of the sensible-heat liquid approach apply here also. To overcome these disadvantages, non-dielectric media, such as water, can be used. If water is used, a suitable quality steam can be generated for use in other parts of the plant. External heat exchange also is expected to be efficient because of high heat transfer coefficients. Unfortunately, the use of a non-dielectric liquid necessitates elaborate corrosion protection schemes (U.S. Pat. No. 3,969,145 to Grevstad et al.; U.S. Pat. No. 3,923,546 to Katz et al.; U.S. Pat. No. 3,940,285 to Nickols et al.) and/or the use of an extremely low conductivity liquid. During operation, the conductivity may increase, so means to restore the low conductivity may also be required. If the cooling loop is under pressure, good seals are necessary. If a leak develops during the life of the stack because of pinholes caused by corrosion or deterioration of seals, it could paralyze the entire system. Because of the corrosion protection requirements and intricate manifolding, the cost of the heat transfer subsystem operating on dielectric coolant could be substantial.

In applicant's view, the foregoing techniques illustrate limitations in the state of the art of thermally controlling fuel cells and the like by reliable, simple and cost-effective practice and a need exists for a fundamentally different approach to the thermal control problem.

SUMMARY OF THE INVENTION

It is an object of the present invention to provide a method for operation of electrochemical cells and system arrangement therefor which enables efficient and simplified thermal control.

In attaining the foregoing and other objects, the invention provides for supplementing the flow of process gas through an electrochemical cell, in measure required for thermal control by sensible heat of process gas, in manner both avoiding electrolyte loss and pressure drop increase across the cell. In implementing this process gas sensible-heat technique, the invention introduces, in addition to the customary process gas passage in communication with the cell electrolyte through an electrode a process gas passage in the cell which is isolated from the cell electrolyte and in thermal communication with a heat-generating surface of the cell. Such electrolyte-communicative and electrolyte-isolated passages are commonly manifolded to a pressurized supply of process gas. The flow levels in the respective passages are set individually by passage parameters to provide both for desired level electrical energy cell output and desired heat removal.

The foregoing and other objects and features of the invention will be further understood from the following detailed discussion thereof and from the drawings wherein like reference numerals identify like parts throughout.

DESCRIPTION OF EXPLANATORY PREFERRED EMBODIMENTS AND PRACTICES

Figure 1:
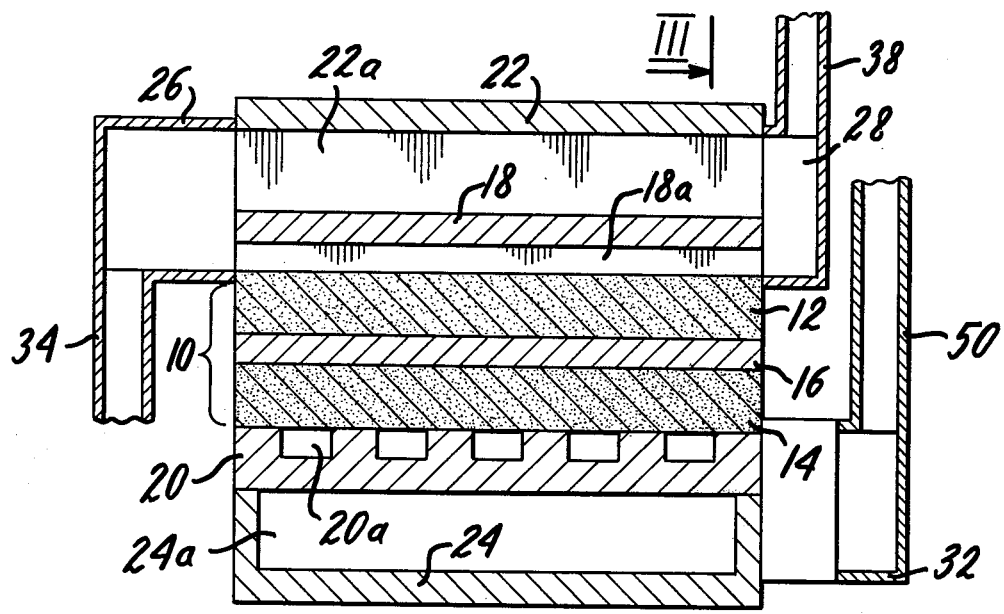
FIG. 1 is a sectional drawing of an explanatory embodiment of a fuel cell in accordance with the invention, as seen along plane I—I of FIG. 2.
Figure 3:
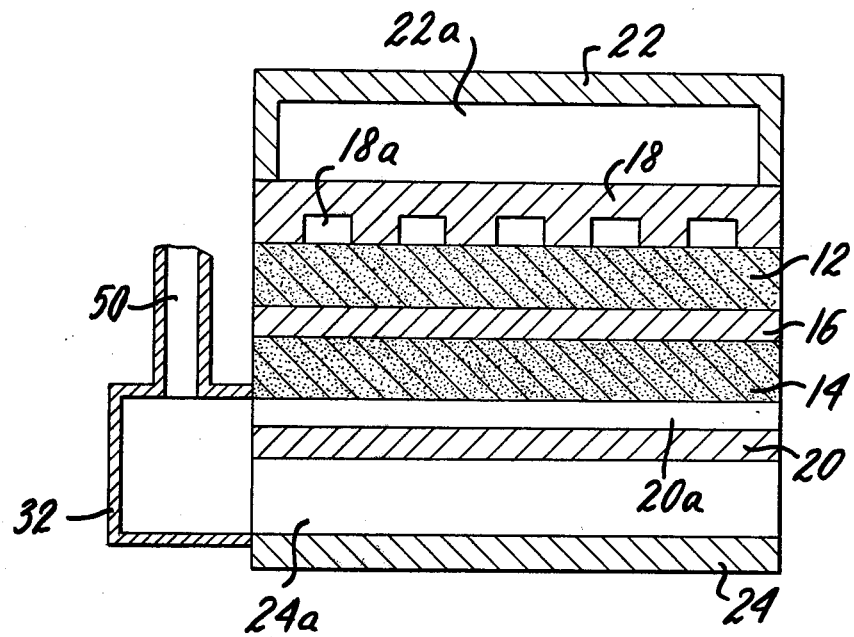
FIG. 3 is a sectional view of the FIG. 1 fuel cell as seen along plane III—III of FIG. 1.

In FIGS. 1 and 3, fuel cell 10 includes anode and cathode electrodes 12 and 14, of gas diffusion type, and electrolyte matrix or layer 16 therebetween. Separator plates 18 and 20 are shown in the explanatory FIG. 1 single cell embodiment as being of unipolar character, defining channel passages 18a, for supplying process gas to anode electrode 12, and passages 20a, for supplying process gas to cathode electrode 14. Based on the gas diffusion character of electrodes 12 and 14, passages 18a and 20a constitute electrolyte-communicative passages.

In accordance with the invention, thermal control plates 22 and 24 are stacked respectively on and under separator plates 18 and 20. Plate 22 includes conduit passage 22a extending in like direction, i.e., across the plane of FIG. 1, with passages 18a and is commonly connected therewith by input anode gas manifold 26 and output anode gas manifold 28.

Figure 2:
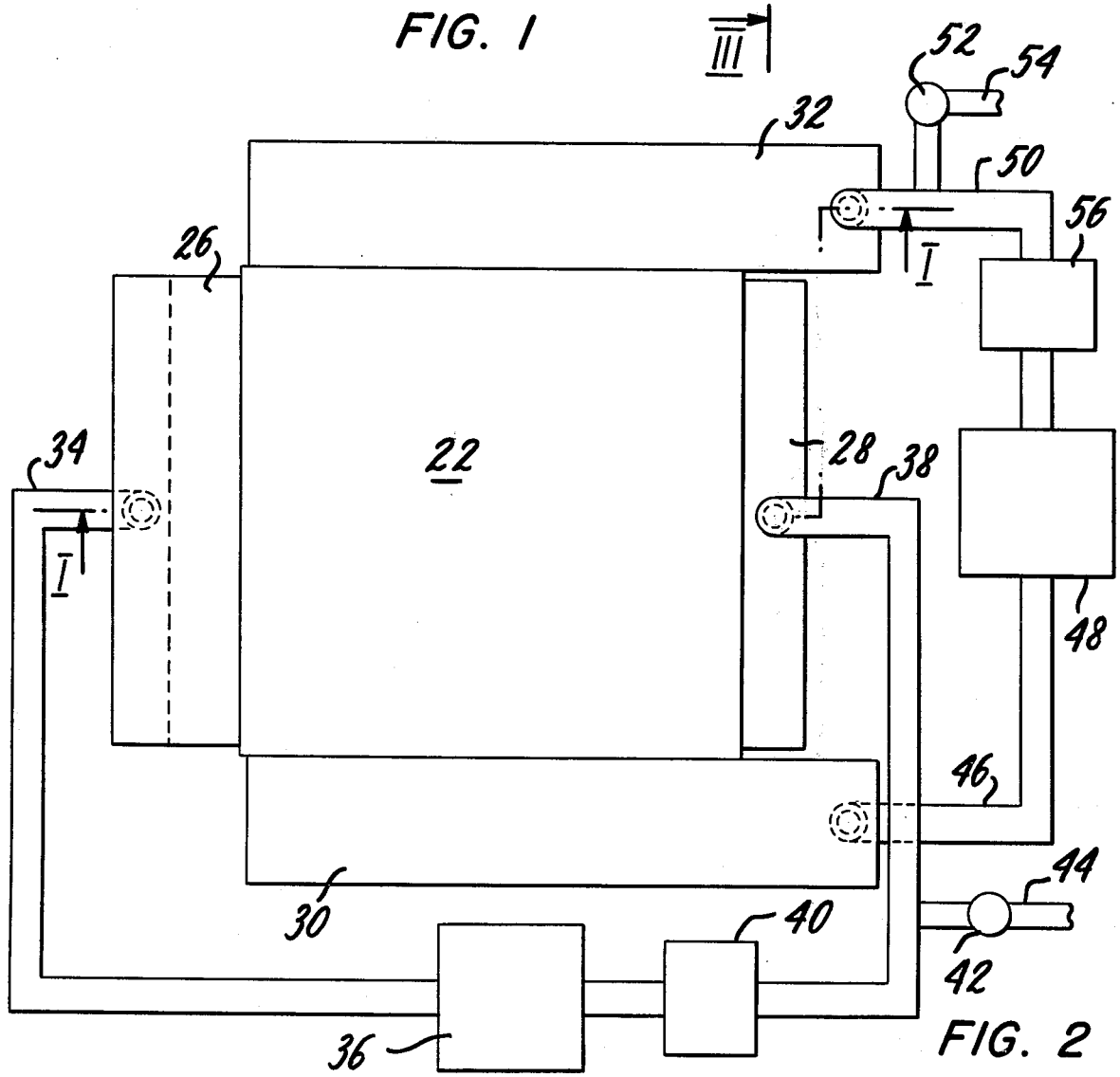
FIG. 2 is a plan elevation of the FIG. 1 fuel cell, shown together with accessory process gas supply and treatment apparatus.

Plate 24 includes conduit passage 24a extending in like direction, i.e., into the plane of FIG. 1, with passages 20a and is commonly connected therewith by input cathode gas manifold 30 (FIG. 2) and output cathode gas manifold 32. Since separator plates 18 and 20 are essentially gas-impermeable, thermal control plate passages 22a and 24a constitute electrolyte-isolated passages. Thus, process gases, i.e., anode gas supplied from manifold 26 and cathode gas supplied from manifold 30, present in passages 22a and 24a can be conducted through the fuel cell to serve thermal control purposes without contributing to electrolyte loss. To the contrary, process gases conducted through channels 18a and 20a give rise to exit gas unavoidably partially saturated with electrolyte vapor.

As alluded to above, certain electrochemical systems involve a single gaseous reactant, e.g., zinc-air batteries. In practicing the subject invention in such systems, a single electrolyte-isolated passage may be commonly manifolded at input and exit with the single electrolyte-communicative gas passage. Further, as is noted below, plural gaseous reactant cells, e.g., fuel cells, may employ thermal control plates for one or the other of the process gases. Where desired, exit admixing of process gas conducted through electrolyte-communicative and electrolyte-isolated passages may be dispensed with in favor of common manifolding solely of input process gas supplied to such diverse character passages. Also, as discussed below, the present invention contemplates the introduction of electrolyte-isolated process gas passages, commonly input manifolded with a process gas supply, individually per plural cells in a stack of fuel cells, for either or both of the diverse process gases.

Referring again to FIG. 2, input anode gas manifold 26 is supplied through feed conduit 34, which is in turn fed from pressurized input anode gas supply 36. Process gas from supply 36 may be admixed with, and thus supplemented by, process gas theretofore conducted through the fuel cell. For this purpose, output gas from manifold 28 is conducted through conduit 38 to external heat exchanger unit 40 and thence to a mixing valve in supply 36. By operation of valve 42, gas may be funneled to purge conduit 44, as desired. If removal of heat from gas conducted through conduit 38 is to be affected prior to recirculation, as is typical, unit 40 is of heat reducing type whereby gas supplied from unit 40 to supply 36 is of temperature lower than the cell operating temperature.

For thermal treatment, purging and recirculation of cathode process gas, counterpart components include feed conduit 46, pressurized input cathode gas supply 48, output gas conduit 50, purge valve 52, purge conduit 54 and external heat exchanger unit 56.

In implementation of methods of the invention, process gas flow is established at a level or levels, as respects electrolyte-communicative passages 18a and/or 20a, to attain predetermined electrical energy to be produced by the electrochemical cell. Even assuming reversibility of electrochemical reactions in fuel cells, a recognized minimum amount of heat is liberated. Also, as alluded to above, irreversibility in fuel cells, resultant from activation, concentration and ohmic overpotentials, results in additional heat generation. Typically, in fuel cells, about fifty percent of input enthalpy shows up as heat and the remainder as such predetermined electrical energy. The heat energy may be ascribed as about one-fifth reversible heat and four-fifths heat due to irreversibility.

With process gas flow in passages 18a and 20a set in accordance with such predetermined desired electrical energy cell output, process gas flow in electrolyte-isolated passages, 22a and/or 24a is now set to obtain a predetermined operating temperature range for the electrochemical cell. The flow in electrolyte-isolated passages, is greatly larger than flow in electrolyte-communicative passages. No completely analytical procedure applies, since input and exit orifice geometry, conduit skin friction, conduit length and manifold geometries demand empirical test. The practice of achieving desired flows in the respective passages may include variation of size and geometry of the flow passages and/or the placement of fixed or variably-settable constrictions in either or both passages.

Figure 4:
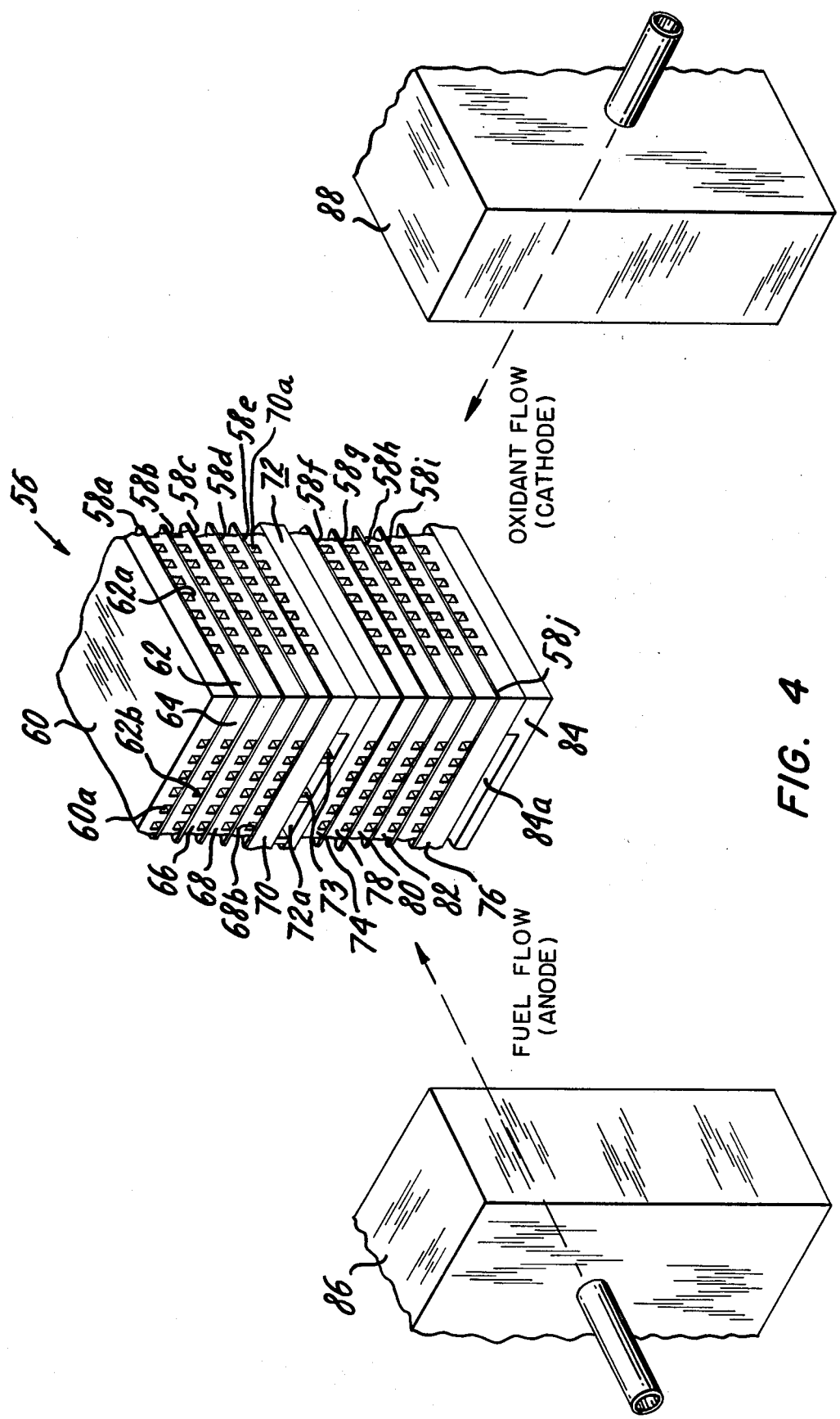

Referring to FIG. 4, a preferred embodiment of cell stack 56 is shown without associated electrical output connections and encasements. Electrolyte layers and gas diffusion anodes and cathodes are identified jointly as cell assemblies 58a–58j. The top separator plate 60 is of unipolar type having electrolyte-communicative channel passages 60a, as in the case of separator plate 18 of FIG. 1, and overlies the anode of top cell assembly 58a. Separator plate 62 is of bipolar type, defining electrolyte-communicative channel passages 62a, which underlie the cathode of top cell assembly 58a, and 62b which overlie the anode of second cell assembly 58b. Bipolar plates 64, 66 and 68 separate cell assemblies 58b, 58c and 58d, with plate 68 gas passages 68b overlying the anode of cell assembly 58e. Separator plate 70 is of unipolar type, having passages 70a underlying the cathode of cell assembly 58e. A sub-stack of five fuel cells is thus provided. Thermal control plate 72 is disposed beneath such sub-stack with its conduit passage 72a in communication with heat-generating surface of the sub-stack, namely, the undersurface of separator plate 70. A like sub-stack of five fuel cells, inclusive of cell assemblies 58f–58j, is disposed beneath plate 72. Unipolar separator plates 74 and 76 are endwise of the sub-stack and bipolar separator plates 78, 80 and 82 are intermediate the sub-stack. Thermal control plate 84 is arranged with its conduit passage 84a in communication with the undersurface of separator plate 76.

Input anode and cathode gas manifolds 86 and 88 are shown schematically and separated from stack 56. Based on the inclusion of thermal control plates 70 and 84 with anode gas conduit passages 72a and 84a, manifold 86 supplies process gas commonly to and through electrolyte-communicative and electrolyte-isolated passages. Cathode fuel flow from manifold 88 is limited to electrolyte-communicative passages in this showing. In the illustrated arrangement, one electrolyte-isolated passage is associated with each sub-stack of five fuel cells. Where a thermal control plate is located between sub-stacks, as in the case of plate 72, it will serve to cool both such sub-stacks. Other assignment of thermal control plates per fuel cells may be made as desired. Stiffening elements 73 may be introduced in plate 72, as shown in FIG. 4, to strengthen the stack and increase heat transfer surface area. Such members are desirably electrically conductive to further enhance electrical current passage through plate 72.

Figure 5:
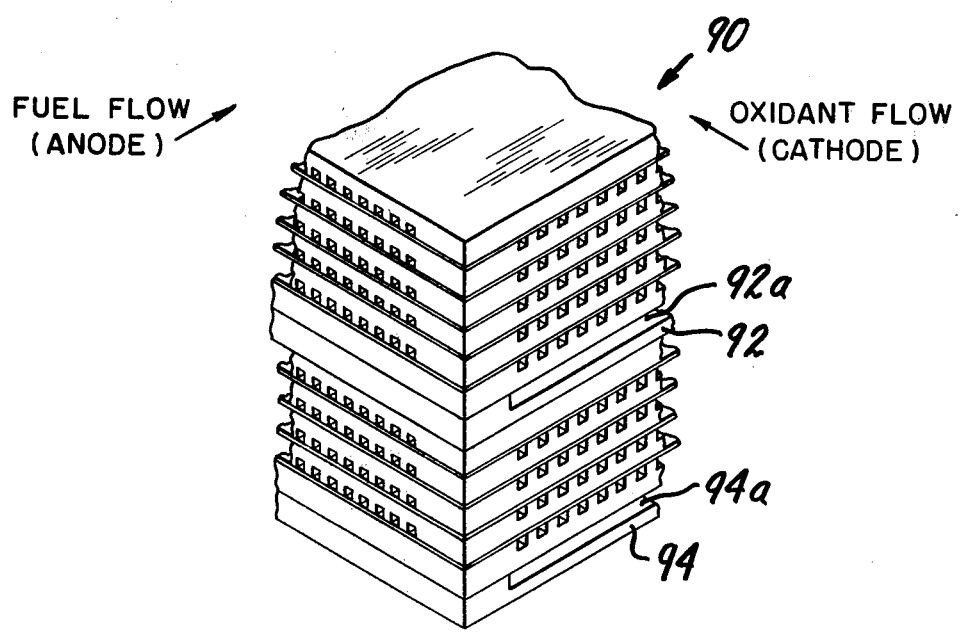
FIGS. 4 and 5 are perspective illustrations of fuel cell stacks in accordance with the invention.

In FIG. 5, an arrangement converse to that of FIG. 4 is shown wherein stack 90 is constructed identically with stack 56 of FIG. 4 except for the disposition of the thermal control plates. Thus, in FIG. 5, thermal control plates 92 and 94 have their conduit passages 92a and 94a disposed for conducting cathode gas through the stack for heat removal. As will be appreciated, the embodiments of FIGS. 4 and 5 may be combined.

The thermal control method and arrangement of the invention will be seen to provide several important benefits. Heat transfer is accomplished by using an additional flow of process gas without requiring any separate manifolding system, as is necessary in case of liquid heat transfer medium. Possibility of corrosion by shunt currents and any harmful effects by leakage are completely eliminated. The system reliability is, therefore, much greater than that for liquid heat transfer media. The electrolyte losses by carry-over or vaporization to the process gases are minimized because only a limited amount of process gases contact the electrolyte. Process gases passing through the thermal control plates do not contact the electrolyte, so vapor losses due to flow of heat transfer gases are absent. The thermal control plates can serve as stiffening members, providing additional strength to the stack assembly. Further, if it is required to replace some defective cells during operation, a group of cells between two thermal control plates can be easily removed and new cells can be replaced.

The invention may be practiced generally in any electrochemical cell having a reactant gas and is particularly adapted to fuel cell usage, such as phosphoric acid fuel cells wherein the process gas used also in thermal control is the cathode gas and/or hydrogenrich anode gas, and molten carbonate fuel cells wherein the process gas used also in thermal control is air/carbon dioxide cathode gas mixture and/or hydrogen-rich anode gas mixture.

Various changes in the described methods of operation and in the illustrated systems may be introduced without departing from the invention. By way of example, one may elect to supplement process gas furnished by supply 36 and/or supply 48 (FIG. 1) solely with process gas conducted through electrolyte-isolated passages, rather than the described admixture of gases conducted through both electrolyte-communicative and electrolyte-isolated passages. To implement this variation, cell output gases are not manifolded but, rather, are separately issued with the issuance conduit of the electrolyte-isolated passage being placed in communication with the input manifold serving both types of passages. Thus, the particularly disclosed practices and system embodiments are intended in an illustrative and not in a limiting sense. The true spirit and scope of the invention is set forth in the following claims.

What is claimed is:

1. A method for operating an electrochemical cell to produce electrical energy from an electrochemical reaction wherein a gas is supplied from a gas supply to a flow passage in said cell in communication with the cell electrolyte, including the steps of:
    (a) setting a gas flow level through said cell for gas conducted through such electrolyte-communicative passage in accordance with predetermined electrical energy to be produced by said cell;
    (b) establishing a further flow passage for gas from said supply through said cell isolated from said electrolyte and in thermal communication with a heat-generating surface of said cell; and
    (c) setting a gas flow level through said cell for gas conducted through such electrolyte-isolated passage to obtain a predetermined operating temperature range for said cell.

2. The method claimed in claim 1 wherein gas conducted through said electrolyte-communicative passage and through said electrolyte-isolated passage is commonly admixed after conductance thereof through said cell.

3. The method claimed in claim 2 including the further step of employing at least part of such common admixture of gas for further supplying of gas to said electrolyte-communicative passage and said electrolyte-isolated passage.

4. The method claimed in claim 3 including the further step of subjecting said common admixture of gas to thermal change prior to such further supplying thereof.

5. The method claimed in claim 4 wherein such thermal change step involves reduction of temperature of said common admixture of gas.

6. The method claimed in claim 1 including the further step of employing at least part of such gas conducted through said electrolyte-isolated passage for further supplying of gas to said electrolyte-communicative passage and said electrolyte-isolated passage.

7. The method claimed in claim 6 including the further step of subjecting such gas part to thermal change prior to such further supplying thereof.

8. The method claimed in claim 7 wherein such thermal change step involves reduction of temperature of said gas part.

9. An electrochemical cell system operative to produce output electrical energy by electrochemical reaction with a process gas, said system comprising:
    (a) an electrochemical cell having an electrolyte and at least one electrode;

(b) first passage means in said cell for conducting gaseous medium to said electrode for reaction with said electrolyte;

(c) second passage means in said cell for conducting gaseous medium through said cell both in isolation from said electrolyte and in thermal communication with a heat-generating surface of said cell; and (d) input manifold means in communication with both said first and second passage means for supplying said process gas thereto.

10. The system claimed in claim 9 further including output manifold means in communication with both said first and second passage means for admixing gas conducted therethrough.

11. The system claimed in claim 10 including conduit means for providing communication between said output manifold means and said input manifold means.

12. The system claimed in claim 11 further including means for affecting thermal change in gas conducted through said output manifold means.

13. The system claimed in claim 9 further including output conduit means in communication with said second passage means for receiving gas conducted therethrough.

14. The system claimed in claim 13 including further conduit means for providing communication between said output conduit means and said input manifold means.

15. The system claimed in claim 14 further including means for affecting thermal change in gas conducted through said output conduit means.

16. The system claimed in claim 12 wherein such thermal change affecting means comprises heat removal means.

17. The system claimed in claim 15 wherein such thermal change affecting means comprises heat removal means.

* * * * *

UNITED STATES PATENT AND TRADEMARK OFFICE
CERTIFICATE OF CORRECTION

PATENT NO. : 4,192,906

DATED : March 11, 1980

INVENTOR(S) : Hansraj C. Maru

It is certified that error appears in the above—identified patent and that said Letters Patent is hereby corrected as shown below:

Column 1, after ELECTROCHEMICAL CELL OPERATION AND SYSTEM on lines 2 and 3, add the following paragraph:

"The Government has rights in this invention pursuant to Contract Number DE-AC03-76ET11440 awarded by the U.S. Department of Energy."

Signed and Sealed this

Nineteenth Day of June 1984

[SEAL]

*Attest:*

GERALD J. MOSSINGHOFF

*Attesting Officer*  *Commissioner of Patents and Trademarks*